United States Patent
Chung et al.

(10) Patent No.: US 8,250,891 B2
(45) Date of Patent: Aug. 28, 2012

(54) TUBE

(76) Inventors: Ching-Chi Chung, Pingtung County (TW); Hsiu-Chen Yang, Kaohsiung (TW)

(*) Notice: Subject to any disclaimer, the term of this patent is extended or adjusted under 35 U.S.C. 154(b) by 565 days.

(21) Appl. No.: 12/467,231

(22) Filed: May 15, 2009

(65) Prior Publication Data
US 2010/0288822 A1    Nov. 18, 2010

(51) Int. Cl.
*B21C 37/12* (2006.01)
(52) U.S. Cl. .................. 72/49; 72/50; 72/367.1; 72/368
(58) Field of Classification Search ............... 72/48, 49, 72/50, 51, 58, 367.1, 368; 228/17.5
See application file for complete search history.

(56) References Cited

U.S. PATENT DOCUMENTS

| | | | | |
|---|---|---|---|---|
| 1,288,134 A * | 12/1918 | Naylor | | 72/50 |
| 1,797,543 A * | 3/1931 | Bryan | | 182/224 |
| 2,301,092 A * | 11/1942 | Thompson et al. | | 101/228 |
| 2,873,353 A * | 2/1959 | Rudd | | 219/62 |
| 3,078,818 A * | 2/1963 | Butler | | 228/145 |
| 3,093,103 A * | 6/1963 | Berkeley | | 228/145 |
| 4,424,727 A * | 1/1984 | Mader | | 76/107.1 |
| 7,229,583 B2 * | 6/2007 | Moriyama et al. | | 264/248 |
| 7,721,767 B2 * | 5/2010 | Houston et al. | | 138/39 |
| 2005/0005990 A1* | 1/2005 | Williams et al. | | 138/150 |
| 2007/0232410 A1* | 10/2007 | Chu | | 473/345 |
| 2009/0169416 A1* | 7/2009 | Li | | 420/420 |
| 2011/0114815 A1* | 5/2011 | Valovick et al. | | 248/560 |

* cited by examiner

*Primary Examiner* — Edward Tolan
*Assistant Examiner* — Homer Boyer

(57) ABSTRACT

A tube, which is especially employed for making the main frame tube of a bicycle, is fabricated by means of a 6-4Ti alloy sheet being fed to the forming mold with a feed device, being cold-rolled with the stamping block, winding the circumferential side of the forming mold as a tube blank with a spiral clearance extending along the tube blank, and welding the tube blank at the spiral clearance as a seam of the finished tube. In this way, the fabricated tube has an advantage of providing a high strength to resist being deformed easily.

2 Claims, 8 Drawing Sheets

TUBE

BACKGROUND OF THE INVENTION

1. Field of the Invention

The present invention is related to a tube and particularly to a tube, which is used for making the main frame tube of a bicycle, fabricated by means of the 6-4Ti alloy being cold-rolled as the tube blank with a spiral clearance being welded as a spiral seam such that the tube provides a high strength without being deformed easily.

2. Brief Description of the Related Art

Referring to FIGS. 1 and 2, the tube 10 for making the conventional main frame tube of a bicycle is made of iron or aluminum alloy usually has a seam. The manufacturing process for the tube 10 is in that the flat metal sheet 11 is squeezed by rolls of the rolling press to form a tubular shaped metal sheet 11, and then the tubular shaped metal sheet 11 is welded to form the complete tube 10 with a straight welded seam line 12. The welded seam line 12 is weak in stress such that it is easy for the tube 10 to break at the seam line 12. In order to overcome the deficiency, titanium or titanium alloy is used as the material of the tube 10 instead. Titanium or titanium alloy has good mechanical properties such as rust-prevention, lightness in weight and high strength. However, it is relatively complicated to work with titanium or titanium alloy and titanium is a metal with high elastic restoration. Hence, it is required a special technique regarding titanium to solve the problem in the field of cold working.

SUMMARY OF THE INVENTION

In order to improve the deficiencies of the conventional tube, the tube according to the present invention employs 6-4Ti alloy as the base material of the tube and 6-4Ti alloy sheet is fabricated to have a spiral shaped clearance for being welded as a finished tube such that property of high strength without being deformed easily can be maintained and it is favorable for enhancing the quality of the main frame tube of the bicycle.

Accordingly, an object of the present invention is to provide a method for making tube in which a 6-4Ti alloy sheet is prepared; the 6-4Ti alloy sheet is stamped with a stamping block for the 6-4Ti alloy sheet being bent and deformed to obtain a predetermined roundness; the bent and deformed 6-4Ti alloy sheet winds the circumferential side of a forming mold to form a tube blank with a spiral clearance; and the tube blank is welded by a welding machine along the spiral clearance to form a finished tube.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
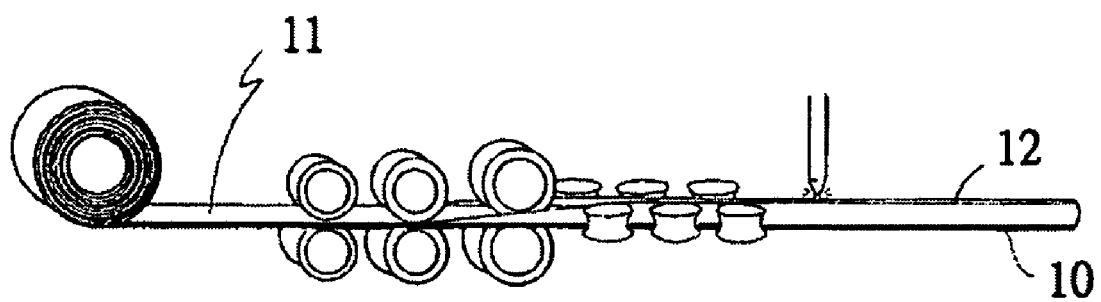
FIG. 1 is a perspective view illustrating a process for forming the conventional tube.
Figure 2:
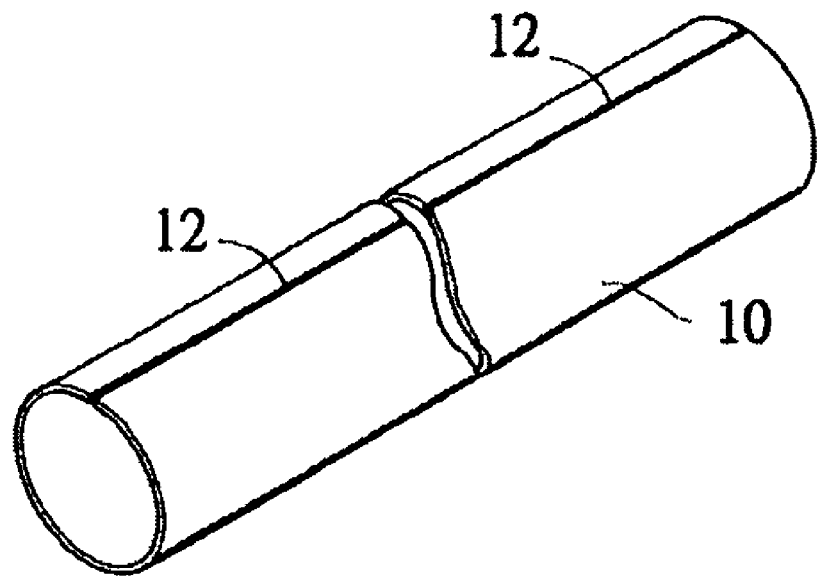
FIG. 2 is a perspective view of the conventional tube.
Figure 3:
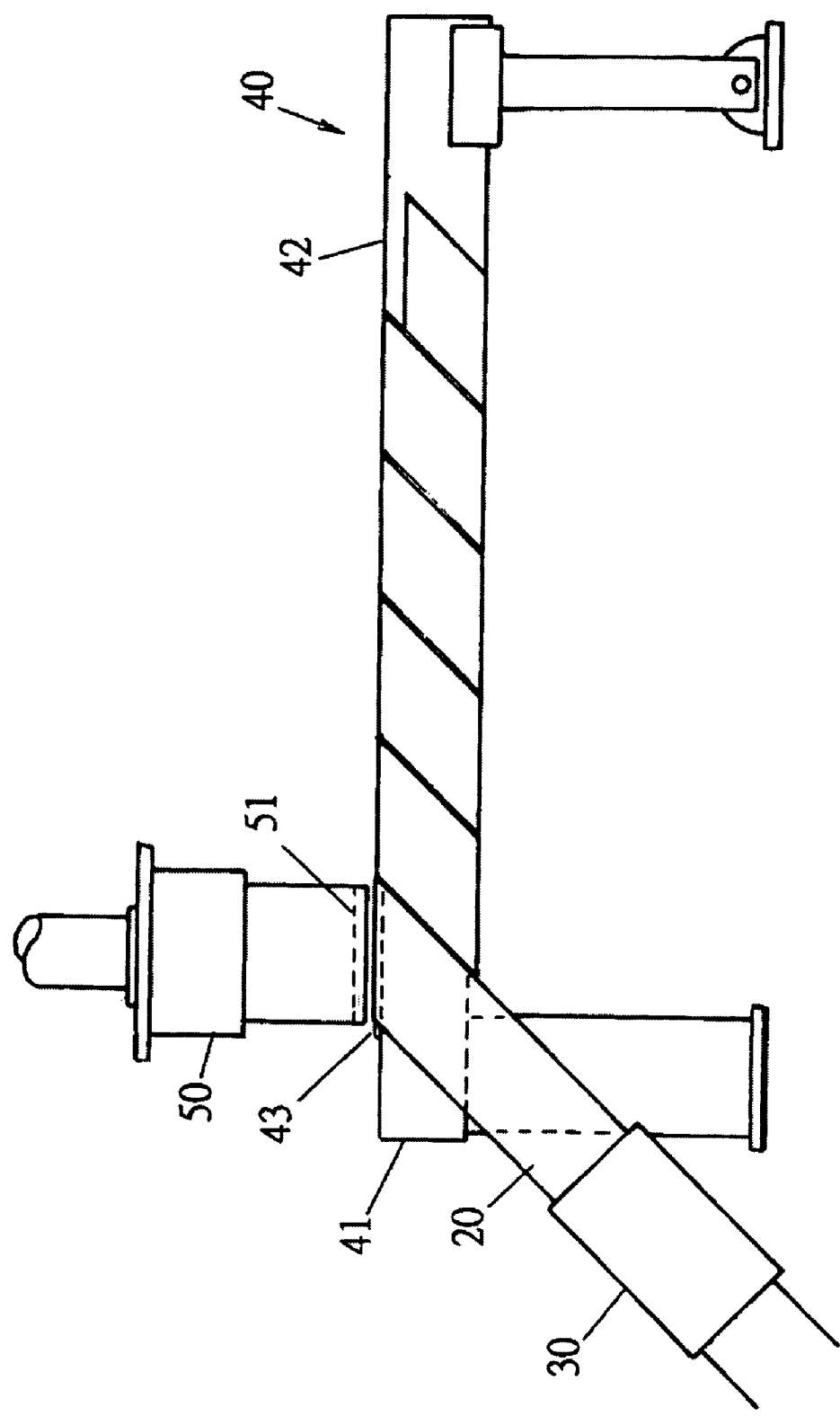
FIG. 3 is a plan view illustrating a process for fabricating a tube according to the present invention.
Figure 4:
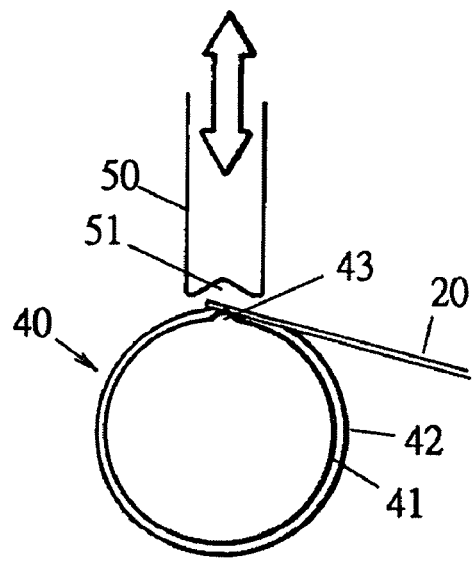
FIG. 4 is a plan view illustrating a process of a 6-4Ti alloy sheet being cold-rolled according to the present invention.
Figure 5:
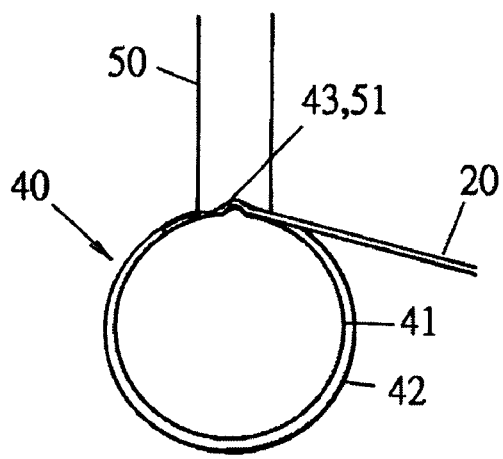
FIG. 5 is a plan view similar to FIG. 4 illustrating the 6-4Ti alloy sheet shown in FIG. 4 being further processed.
Figure 6:
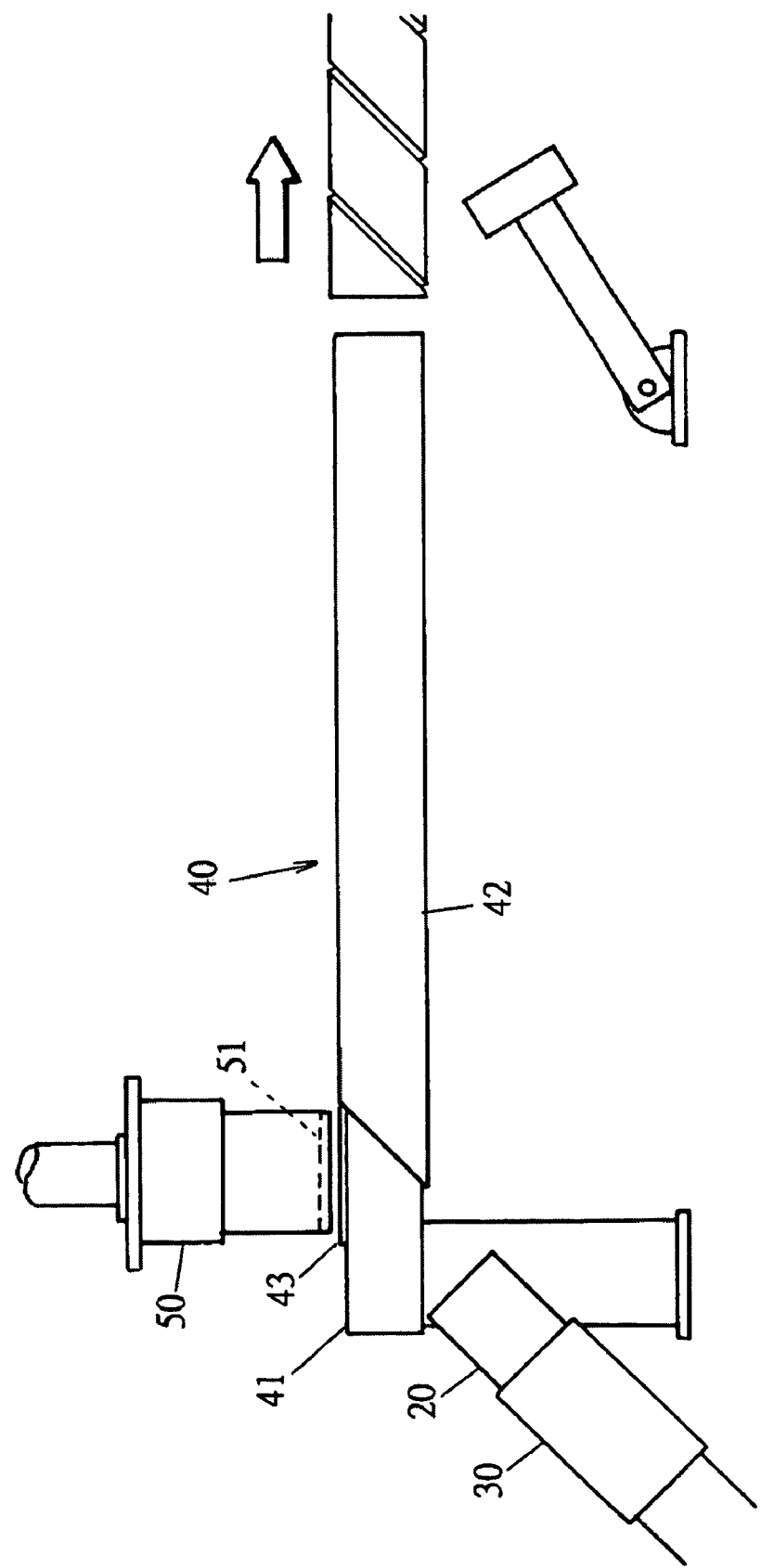
FIG. 6 is a plan view similar to FIG. 4 illustrating the tube being further processed.
Figure 7:
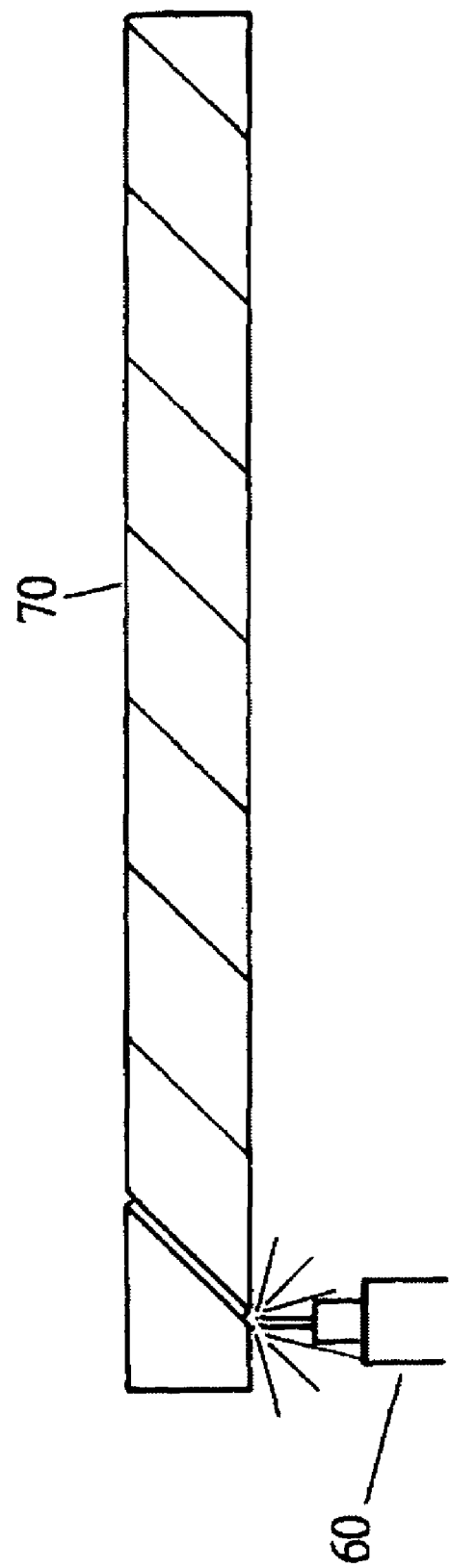
FIG. 7 is a plan view illustrating the tube of the present invention being treated with welding.
Figure 8:
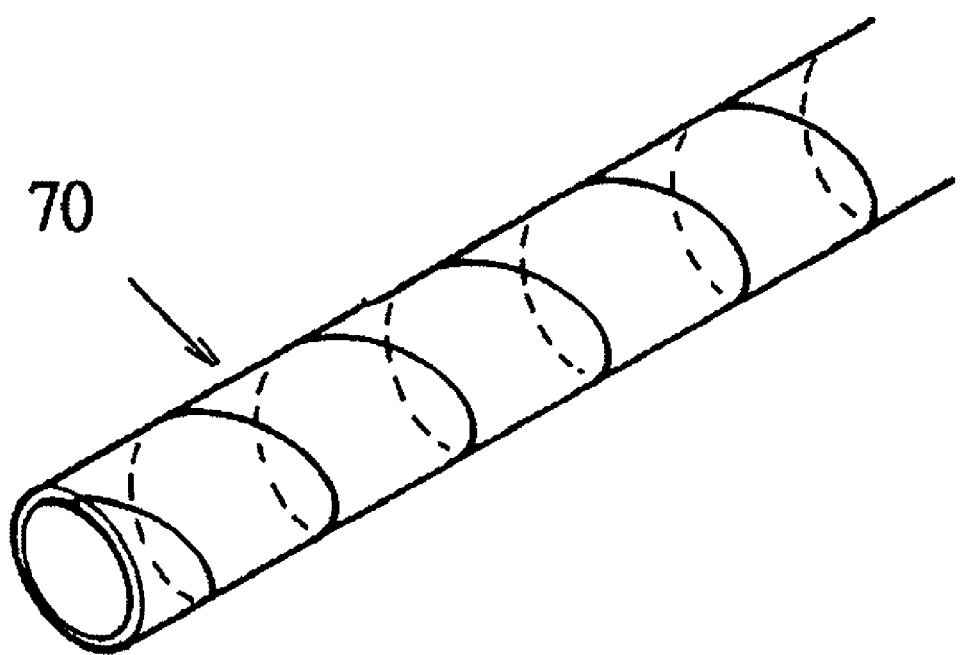
FIG. 8 is a perspective view of the tube of the present invention.
Figure 9:
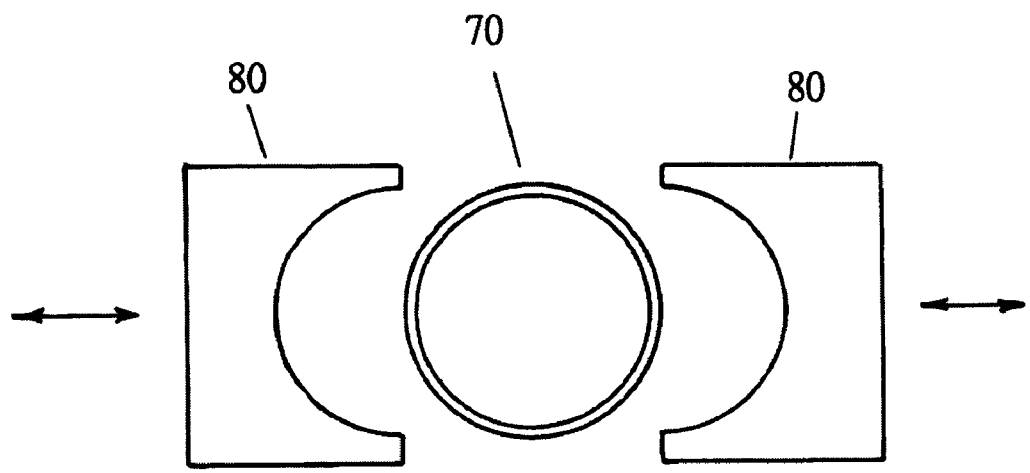
FIG. 9 is a plan view illustrating the tube of the present invention undergoing a reduction.
Figure 10:
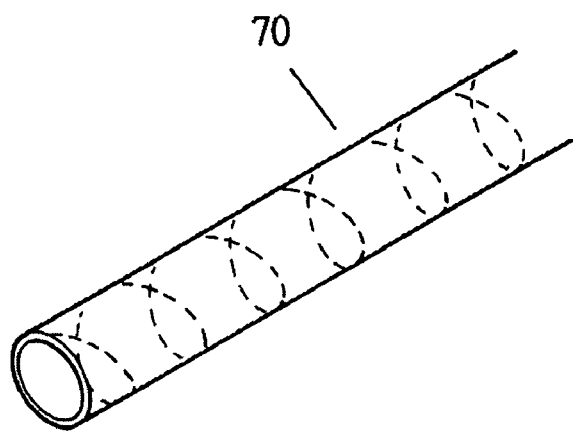
FIG. 10 is a perspective view illustrating the reduced tube of the present invention.

Referring to FIG. 3, a process for forming a tube according to the present invention is illustrated. A 6-4Ti alloy sheet 20 is placed in a feed device 30 and enters a forming mold 40 after being sent out by the feed device 30. The 6-4Ti alloy sheet 20 has a specific width with a thickness under 3 mm. The forming mold 40 is a cylindrical stick with a forming end 41 at the front thereof and an unloading end 42 at the rear thereof. The forming end 41 has a diameter slightly less than that of the unloading end 42. Further, a "V" shaped catch area 43 is disposed at the outer surface of forming end 41 and projects outward from the outer surface of the forming end 41. A pressing block 50 is disposed right over the catch area 43. The pressing block 50 moves upward and downward repeatedly along with a stamping press (not shown). The bottom of the pressing block 50 has an inward "V" shaped notch 51 corresponding to the catch area 43. Referring to FIGS. 4 and 5, when the 6-4Ti alloy sheet 20 is delivered to the forming mold 40 by the feed device 30, the 6-4Ti alloy sheet 20 is disposed at an angle which is preferably between 40° and 50° apart from the forming mold 40 and stamped by the pressing block 50 such that the 6-4Ti alloy sheet 20 is deformed and bent. The deformation of the 6-4Ti alloy sheet 20 depends upon the space between the catch area 43 and the inward notch 51 of the pressing block 50. It is especially needed to consider the restoration resulting from the elasticity of Titanium for acquiring a predetermined roundness capable of just winding the outer surface of the unloading end 42 spirally. The 6-4Ti alloy sheet 20 being fed to the forming mold 40 continuously in association with the operation of the pressing block 50 repeatedly allows the 6-4Ti alloy sheet 20 to form a tubular shape and move along the forming mold 40. In this way, a tube blank with a preset length is formed with a spiral clearance being disposed and extending from one end to the other end of the tube blank, and the tube blank is taken out of the unloading end 42 (see FIG. 6). It is appreciated that the spiral clearance is very fine due to the tube blank being made of 6-4Ti alloy sheet. The spiral clearance is then seamed with a welding machine 60 to form a welded tube 70 as shown in FIGS. 7 and 8. Referring to FIGS. 9 and 10, the welded tube 70 is further finished with a press mold 80 to perform an operation to reduce the diameter of the welded tube 70. The press mold 80 has a mold cavity with a diameter slightly smaller than the outer diameter of the welded tube 70 such that the welded tube 70 is pressed with the press mold 80 and the outer diameter of the welded tube 70 is reduced. Under the circumferences, the crystallization of the molecules of the titanium becomes a finer crystalline structure to enhance the tensile strength and fatigue durability. Meanwhile, the welded seam of the tube 70 becomes disappeared due to the structures of the titanium molecules being changed such that a process of grinding the outer surface of the tube 70 can be omitted to save the fabrication cost economically. The tube 70 can be heated to 600° C. with a treatment of annealing under a protection of an idle gas for reliving the stress inside the tube 70 after the process of operation of diameter reduction such that the extensibility can be enhanced with maintaining the high strength.

It is appreciated that the tube 70 of the present invention is made of 6-4Ti alloy sheet 20, and is fabricated with the process of the cold-rolling to form a tube blank with a spiral clearance disposed along the circumferential side of the tube blank for being welded with the welding machine 60 before the tube blank is finished as the tube 70. The welded seam being disposed at the circumferential side of the tube 70 spirally and evenly results in the tube 70 being capable of having an equilibrium stress distribution such that the strength of the tube 70 can be promoted and the deformation of the tube 70 can be lowered substantively. Further, 6-4Ti alloy provides properties such as the extremely high tensile strength, the lightness in weight and the anticorrosion. Therefore, when the tube 70 of the present invention is employed to make the main tube frame of a bicycle, the quality and performance of the bicycle are capable of upgrading effectively. While the invention has been described with referencing to a preferred embodiment thereof, it is to be understood that modifications or variations may be easily made without departing from the spirit of this invention, which is defined by the appended claims.

What is claimed is:

1. A method for making a cold-rolled 6-4Ti tube which is used for fabricating tube seats of a bicycle comprising following steps:
    (a) placing a 6-4Ti alloy sheet with a predetermined width, length and thickness in a feed device;
    (b) sending the 6-4Ti alloy sheet to a rod shaped forming mold which has a forming end and an unloading end via the feed device;
    (c) stamping said 6-4Ti alloy sheet with a pressing block disposed right over the forming end to deform and bend said 6-4Ti alloy sheet so as to allow the bent 6-4Ti alloy sheet to wind the forming mold with a predetermined roundness and form a tube blank moving along the forming mold and outward the unloading end with a fine spiral clearance extending from one end to another end of the tube blank;
    (d) seaming the spiral clearance with a welding machine to form a welded tube;
    (e) reducing the outer diameter of the welded tube with a press mold which has a mold cavity with a diameter slightly smaller than the outer diameter of the welded tube, and removing the welding seam on the welded tube as well in the process;
    (f) finally, annealing the welded tube with heat of 600° C. to relieve stress inside the welded tube;
    wherein, in step (b), when being delivered to the forming mold with the feed device, the 6-4Ti alloy sheet is disposed to have a feed angle less than 50° apart from the forming mold, the forming mold has a "V" shaped catch area disposed at the forming end and projecting outward from the outer surface of the forming end, and the pressing block has an inward "V" shaped notch corresponding to the catch area to deform and bend the 6-4Ti alloy sheet for facilitating the 6-4Ti alloy sheet being deformed and bent.

2. A method for making a cold-rolled 6-4Ti tube according to claim 1, wherein the feed angle is between 40° and 50°, and the thickness of said 6-4Ti alloy sheet is less than 3 mm.

* * * * *